United States Patent [19]

Brinkman et al.

[11] Patent Number: 4,702,671
[45] Date of Patent: Oct. 27, 1987

[54] SLIP RING EXPANSION JOINT

[75] Inventors: Earl H. Brinkman; Bruce L. Morrison, both of Schenectady, N.Y.

[73] Assignee: General Electric Company, Schenectady, N.Y.

[21] Appl. No.: 739,408

[22] Filed: May 30, 1985

[51] Int. Cl.$^4$ ............................................. F04D 29/12
[52] U.S. Cl. ................................. 415/134; 415/136; 277/174
[58] Field of Search ................... 415/134, 135, 136; 277/26, 30, 174, 173, 175, 176, 177, 165

[56] References Cited

U.S. PATENT DOCUMENTS

| | | | |
|---|---|---|---|
| 1,625,541 | 4/1927 | Hodgkinson | 415/136 |
| 2,112,738 | 3/1938 | Doran | 415/108 |
| 2,649,315 | 8/1953 | Ipsen | 285/162 |
| 2,800,299 | 7/1957 | Sheppard et al. | 415/136 |
| 2,815,645 | 12/1957 | Downs | 60/40 |
| 2,863,632 | 12/1958 | Miller | 415/136 |
| 2,880,045 | 3/1959 | Wankel | 277/174 |
| 3,277,797 | 10/1966 | Tyree, Jr. et al. | 277/26 |
| 3,532,446 | 10/1970 | Herreshoff | 277/173 |
| 3,727,927 | 4/1973 | Packard | 277/173 |
| 4,455,028 | 6/1984 | Johansson | 277/174 |
| 4,477,090 | 10/1984 | Johansson et al. | 277/53 |

FOREIGN PATENT DOCUMENTS

| | | | |
|---|---|---|---|
| 1162384 | 2/1964 | Fed. Rep. of Germany | 415/136 |
| 1163097 | 2/1964 | Fed. Rep. of Germany | 277/173 |
| 35204 | 3/1983 | Japan | 415/134 |
| 70813 | 4/1984 | Japan | 415/134 |
| 718534 | 11/1954 | United Kingdom | 415/134 |

Primary Examiner—Robert E. Garrett
Assistant Examiner—John Kwon
Attorney, Agent, or Firm—Jerome C. Squillaro

[57] ABSTRACT

An expansion joint for sealing the periphery of a component passing through a bore in a member comprises a component sealing element and a bore sealing element, each having a respectively alignable hole therethrough for defining an opening for receiving the component through the expansion joint. The radial outer surface of the bore sealing element sealingly engages the bore and the radial inner surface of the component sealing member that defines the hole therethrough is radially outwardly relieved over a first portion so that a second portion of the inner surface sealingly contacts the periphery of the component along a line which is everywhere tangent to the component, thereby accommodating skew between the central axis of the component and the central axis of the bore. Lateral surfaces of the component and bore sealing elements are mutually sealingly engaged during assembly.

9 Claims, 4 Drawing Figures

SLIP RING EXPANSION JOINT

BACKGROUND OF THE INVENTION

This invention relates to slip-type expansion joints, such as a multiple ring sealed slip joint, for sealing a steam conduit which passes through a plurality of shells, or casing members, of a steam turbine and, more particularly, to an improved slip-type expansion joint for sealing a steam conduit, wherein the bores of the shells through which the conduit passes are not perfectly registered.

In general, steam turbines operate to convert energy stored in high-pressure, high-temperature steam into rotational mechanical movement. Steam turbines employed by electric utilities in the generation of electric power typically comprise a plurality of turbine blades, or buckets, radially mounted on the periphery of a rotor shaft and disposed so as to form a plurality of bucket wheels. The rotor shaft, with associated bucket wheels, is mounted on bearings with the bucket wheels desposed inside an inner shell which is in turn surrounded by a spaced apart outer shell. This double shell configuration forms a pressurizable housing in which the bucket wheels rotate and prevents potentially damaging thermal gradients. The bucket wheels are disposed between stationary nozzle rings which are formed by circular arrays of stationary curved partitions substantially radially disposed between and fixedly retained by a pair of concentric diaphragm rings. These partitions are generally referred to as nozzle partitions and the spaces between the partitions as nozzles. As steam flows through the interior cavity of the pressurizable inner shell, it alternately passes through stationary nozzle partitions and rotating turbine bucket wheels to produce rotational movement of the shaft. The combination of a pair of diaphragm rings with their associated partitions and the cooperating row of buckets is generally referred to as a stage, stages being numbered sequentially in the direction of steam flow starting from the steam input region.

Modern large steam turbines generally comprise several sections such as, for example, high-pressure, intermediate pressure, low-pressure and reheat. These sections possess various design characteristics so as to permit extraction of an optimum amount of energy from the expansion of steam through the respective turbine sections, thereby optimizing overall turbine efficiency. It is common practice to have one or more of these sections configured in a double flow arrangement, in which steam entering a middle portion, or tub, of the section encounters a diverging flow path. After entry into this middle portion of one of the turbine sections, steam exits in substantially opposite directions, wherein the oppositely directed steam flows are used to impart rotation in the same direction to the turbine shaft. Thus, for example, steam entering from the top or bottom of a turbine section having a horizontally disposed shaft exits toward the left and right to flow generally axially through the turbine. This double flow configuration beneficially contributes to overall machine efficiency. These concepts are elementary and are generally well known in the steam turbine art.

Reference to U.S. Pats. No. 2,112,738 —Doran, issued Mar. 29, 1938; 2,649,315 —Ipsen, issued Aug. 18, 1953; 2,800,299 —Sheppard et al, issued Jul. 23, 1957; 2,815,645 —Downs, issued Dec. 10, 1957 and 2,863,632 —Miller, issued Dec. 9, 1958, and all assigned to the present assignee, indicates that it is known to use conventional slip-type expansion joints at the site of a bore of a member through which a conduit passes for sealing the periphery of the conduit against undesirable passage of steam. These conventional slip-type expansion joints employ a conventional conduit sealing ring having a cylindrical inner surface defining a hole therethrough for sealingly engaging the periphery of the conduit. However, in certain applications, it may be desirable or necessary that the conduit pass through a plurality of spaced apart members, such as shells, each member having a bore therethrough, and the bores registered so that the conduit may pass through the bores and be sealed at each bore by a slip-type expansion joint.

There may be situations, such as when one of the spaced apart members is replaced by a different member after a period of operation, wherein the bores through the members may not exactly align or register to permit the conduit, which is generally rigid, to be installed while still achieving adequate sealing at each bore by a conventional slip-type expansion joint. When it is attempted to insert a conduit through a conventional conduit sealing disposed in a bore ring, wherein the conduit is not aligned with the hole through the sealing ring, the leading edge of the conduit will contact the surface of the hole at different axial extents from the entrance of the hole, which may prohibit further entry of the conduit into the hole. On the other hand, if the conventional sealing ring, which is not generally rigidly secured in the bore during assembly, is placed around the conduit and then reseated in the bore, the lateral sides of the conventional sealing ring will not properly mate with adjacent lateral sealing surfaces in the expansion joint, i.e. the lateral sides of the conventional sealing ring will be skewed with respect to the radial axis of the bore, whenever the conduit is not aligned with the central axis through the bore. Thus, it would be desirable to have a slip-type expansion joint which would sealingly receive a conduit while accommodating a predetermined amount of misalignment between the central axis of the conduit and the central axis of the bore or a predetermined amount of misalignment in the registration of bores through spaced apart turbine members.

Accordingly, it is an object of the present invention to provide an improved slip-type expansion joint at a bore of a turbine member that sealingly receives a conduit, while accommodating misalignment in the registration of bores receiving the same conduit through other spaced apart turbine members.

Another object is to provide an improved slip-type expansion joint at a bore of a turbine member that sealingly receives a conduit, while accommodating misalignment between the central axis of the conduit and the central axis of the bore.

Still another object is to provide an improved slip-type expansion joint which may be readily retrofitted to existing turbine members without hindering operation of the members.

Yet another object is to provide an improved slip type expansion joint at a bore of a member that sealingly receives a conduit, while accommodating misalignment between the designed orientation and the actual orientation of the conduit through the bore.

SUMMARY OF THE INVENTION

In accordance with the present invention, a slip-type expansion joint for sealingly receiving a component through an opening in the expansion joint comprises bore sealing means having an inner surface defining a hole therethrough, an outer surface for sealingly engaging a bore of a member in which the bore sealing means is to be disposed and a lateral surface, and component sealing means having an inner surface defining a hole therethrough and a lateral surface for sealingly engaging the lateral surface of the bore sealing means, wherein the hole of the bore sealing means and the hole of the component sealing means are alignable for forming the opening in the expansion joint, and further wherein a first portion of the inner surface of the component sealing means is relieved such that only a second portion of the inner surface of the component sealing means sealingly engages the component whenever the component is received through the opening in the expansion joint. The expansion joint of the present invention may be beneficially employed to provide a seal at the bore of each of a plurality of spaced apart members through which the component passes, such as in a steam turbine, especially when the bores are not exactly registered. Further, the first position of the inner surface of the component sealing means is preferably relieved such that the second portion of the inner surface of the component sealing means engages the component along a line which is everywhere tangent to the periphery of the conduit. For a conduit having a cylindrical periphery the tangential sealing line will be a circle or an ellipse.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

The present invention relates to a slip-type expansion joint for sealing the periphery of a conduit which passes through respective registrable bores of a plurality of members, such as casing shells, of a steam turbine, and is especially applicable to situations in which registration between bores is not exactly aligned. Such misalignment may occur, for example, due to tolerance build-up during manufacture, especially when members are independently fabricated having a respective bore and then assembled, as opposed to being fabricated without a bore, assembled and then having respective registered bores machined therethrough. Misalignment of bores may also occur when one of a group of members, the group including respective registrable bores, needs to be replaced, such as after a design modification or expenditure of useful life of the member. It is to be understood that expansion joints of the present invention may be used for sealing the periphery of a conduit whenever the conduit passes through a bore, and thus may be desirable even for applications where the conduit only passes through a single bore since the expansion joint of the present invention is able to compensate for misalignment between the central axis of the bore and the central axis of the conduit.

Figure 1:
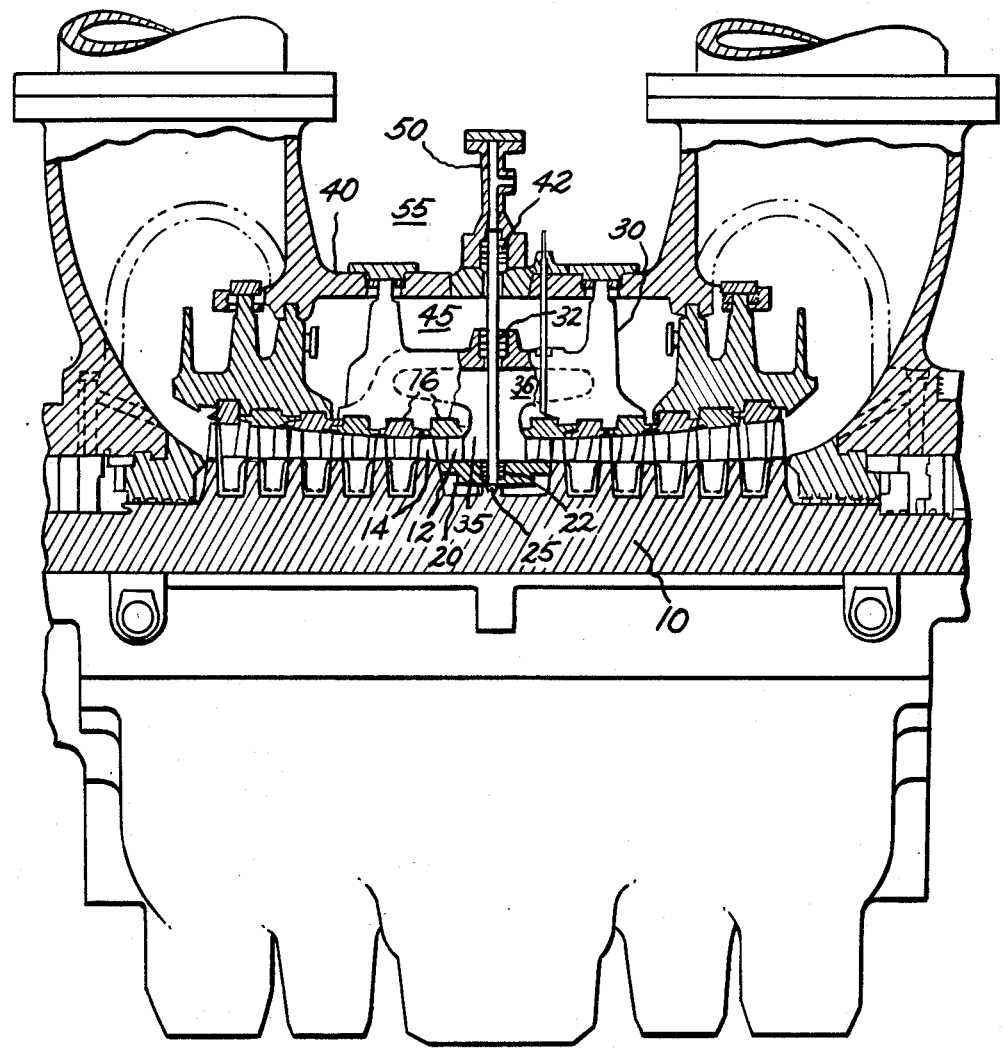
FIG. 1 is a partial sectional elevational view of a double flow reheat section of a steam turbine showing a conduit sealingly passing through three members of the steam turbine in accordance with the present invention.

Referring to FIG. 1, a specific application and embodiment of the present invention is shown. It is to be understood that this application is illustrative only, and that the present invention is applicable to any situation requiring a generally rigid conduit to sealingly pass through a member, such as one of a plurality of spaced apart components of a steam turbine.

Shown in FIG. 1 is a cutaway elevational view of a double flow reheat section of a steam turbine. The reheat section comprises a rotor 10, a reheat tub diaphragm 20, spaced from and circumferentially surrounding rotor 10 for forming a tub chamber 25 therebetween, an inner shell 30, spaced from and circumferentially surrounding tub diaphragm 20 for forming an inner chamber 35 therebetween, and an outer shell 40, spaced from and circumferentially surrounding inner shell 30 for forming an outer chamber 45 therebetween. An alternating respective plurality of cooperating nozzle partitions 12 and turbine blades 14 are axially spaced along and circumferentially surround rotor 10. Nozzle partitions 12 are secured to diaphragm ring 16 which in turn is affixed to inner shell 30 and turbine blades 14 are secured to and rotate with rotor 10. Steam is admitted in a generally axial central portion 36 of the reheat section and is directed to flow into inner chamber 35 and then in opposing axial directions (right and left in FIG. 1) through corresponding sets of nozzle partitions 12 and turbine blades 14, which are accordingly arranged to provide rotation force in the same direction to rotor 10. This divided axial flow is known as double flow in the art.

Also shown as being disposed in a generally axial central location of the reheat section is an elongated conduit 50, which passes through appropriate respective bores 22, 32 and 42 in reheat tub 20, inner shell 30 and outer shell 40, respectively, for delivering steam from a source outside outer shell 40 (such as from the second stage of a high pressure section (not shown) of the turbine for cooling the first stage of the reheat turbine during operation) to tub chamber 25 along the periphery of rotor 10. Steam from a source outside outer shell 40, such as from a boiler (not shown), and delivered by conduit 50, may also be used for prewarming rotor 10 before start-up and operational rotation of rotor 10 is commenced. Each of bores 22, 32 and 42 is typically cylindrical and respectively has a slip-type expansion joint 24, 34 and 44, fabricated in accordance with the present invention, and respectively disposed therein for sealing the outer periphery of conduit 50 against steam flow among any of chambers 25, 35 and 45 and/or ambient environment 55. The outer periphery of conduit 50 is typically cylindrical and includes a coating of an abrasive and wear resistant material, such as Stellite, disposed thereon over the respective region of the outer periphery of conduit 50 expected to be disposed within expansion joints 24, 34 and 44, respectively. Further, for convenience and ease of assembly, the diameter of conduit 50 may be reduced at each respective radially inner region over the next radially outer region of the outer periphery of conduit 50 expected to be disposed within expansion joints 24, 34 and 44, respectively.

Figure 2:
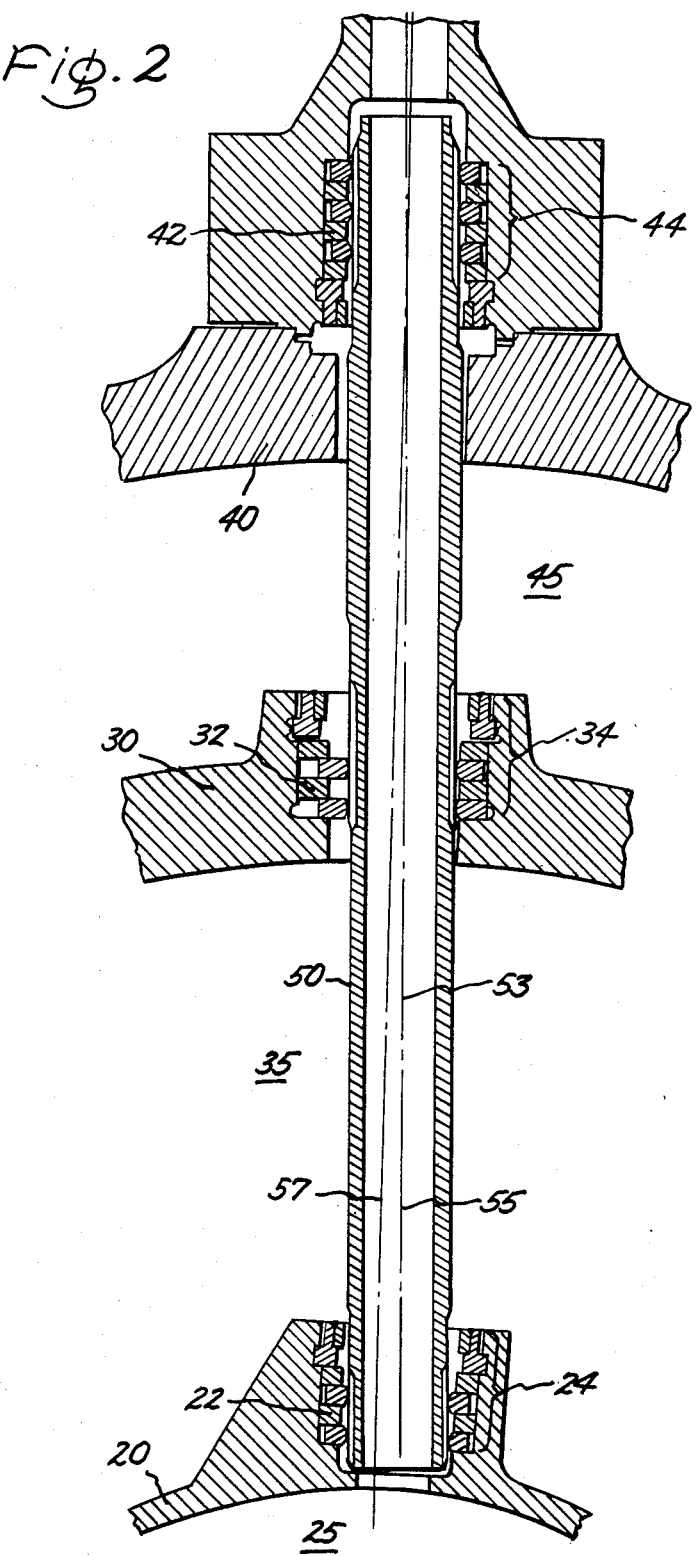
FIG. 2 is an enlarged partial sectional view of the conduit and slip-type expansion joints of FIG. 1.

Referring to FIG. 2, an enlarged partial sectional view of conduit 50 disposed through slip-type expansion joints 24, 34 and 44 of FIG. 1 is shown. Conduit 50 has a central axis 55 which is shown coextensive with central axis 53 of bores 22, 32 and 42. Also shown is a reference line 57 which indicates the maximum permissable displacement of axis 55 from central axis 53 through bores 22, 32 and 42. The locus of the surface of revolution of reference line 57 about central axis 53 of bores 22, 32 and 42 thus defines a conic section having an apex at the intersection of reference line 57 and central axis 53. Central axis 53 and reference line 57 are shown intersecting at expansion joint 44 and reference line 57 diverges from central axis 53 as it approaches expansion joint 24. The system may also be configured so that reference line 57 intersects central axis 53 of expansion joints 22, 32 and 42 at expansion joint 24 and diverges from central axis 53 as it approaches expansion joint 44.

Figures 3, 4:
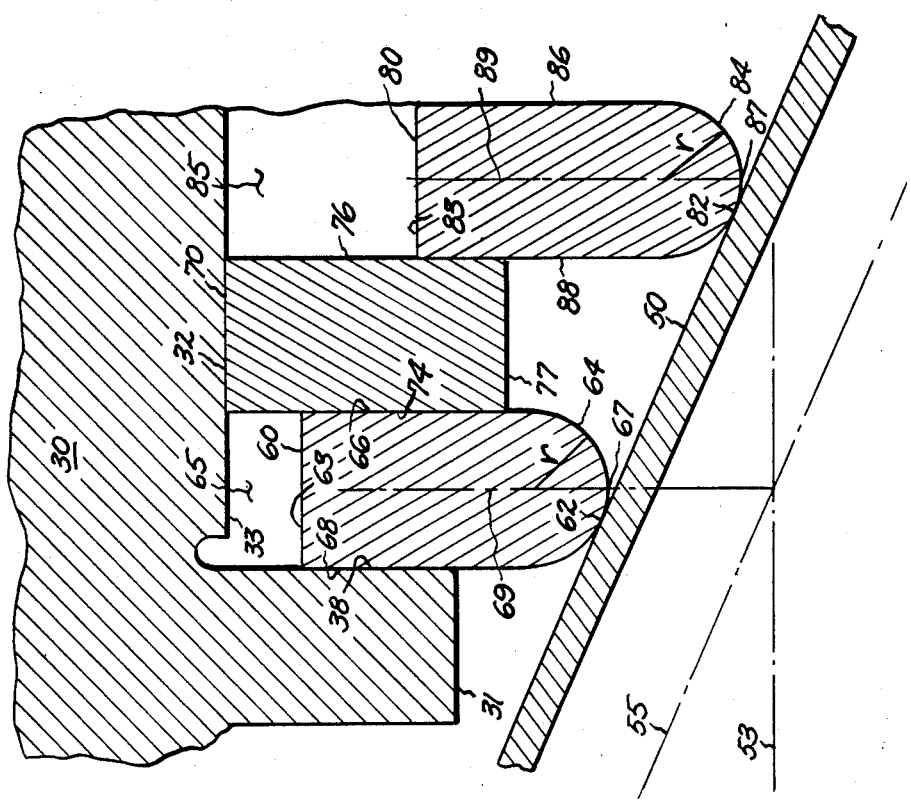
FIG. 3 is an enlarged sectional view of a slip-type expansion joint of FIG. 1.
FIG. 4 is an enlarged sectional view of a portion of the slip-type expansion joint of FIG. 1.

Referring to FIG. 3, expansion joint 34 at bore 32 of inner shell 30 having conduit 50 extending therethrough is shown in an enlarged scale. It is to be understood that expansion joints 24 and 44 function analogously to expansion joint 34. Therefore, detailed description and operation of expansion joints 24 and 44 will not be provided in order to avoid undue repetition.

Expansion joint 34 comprises a plurality of slip joint segments, each slip joint segment including a conduit sealing ring 60 and a bore sealing ring 70. Another slip joint segment includes a conduit sealing ring 80 and a bore sealing ring 90. Although expansion joint 34 typically includes at least two slip joint segments, there may be applications wherein only one slip joint segment including conduit sealing ring 60 and bore sealing ring 70 may be used, such as where the pressure drop across expansion joint 34 is relatively low.

Conduit sealing ring 60 is generally annular and includes substantially radially extending lateral flat sealing surfaces 66 and 68, a radial inner surface 64 and a sealing, or contact, portion 62 of radial inner surface 64. Inner surface 64 is circumferentially radially outwardly relieved over a first portion such that sealing portion 62 preferably sealingly contacts the periphery of conduit 50 only along a tangential line which preferably lies in a single plane, e.g. circle or ellipse if the periphery of conduit 50 is cylindrical. Further, relief provided to inner surface 64 permits conduit 50 to be readily installed through expansion joint 34 during assembly, whenever axis 55 of conduit 50 is not coextensive with axis 53 of bore 32. Surface 64 may assume many shapes consistent with sealingly obtaining single point tangency along a line between sealing portion 62 and the periphery of conduit 50, such as generally convex, U-shaped, V-shaped, parabolic, hyperbolic, ogival, spherical with a radius of curvature r. It is to be understood that for some applications, the desired shape of surfaces 64 and 84 may be approximated in cross section by an arc of a circle having a radius r, so that even if non-single point tangency or non-elliptical contact between the periphery of conduit 50 and surfaces 64 and 84 is obtained, adequate sealing may be achieved. This approximation is applicable for cases where skew between axis 53 of bore 32 and axis 55 of conduit 50 are less than a predetermined amount. Manufacturing methods, structural limitations and operational conditions will dictate configurations of surfaces 64 and 84 which may be used for a particular application.

The diameter of surface 63 of sealing ring 60 is less than the diameter of the portion of bore 32 defined by surface 33 of bore 32 and greater than the portion of bore 32 defined by surface 31 of bore 32, so that a circumferential accommodation region 65 is available to permit sealing ring 60 to radially translate in bore 32 without movement of surface 63 being hindered by surface 33 whenever axis 55 of conduit 50 is not coextensive with axis 53 of bore 32. Surface 63 will be generally uniformly spaced from surface 33 of bore 32, and thus accommodation region 65 will be generally circumferentially uniform, whenever axis 55 of conduit 50 is coextensive with axis 53 of line 32.

Bore sealing ring 70 is disposed in the section of bore 32 defined by surface 33 such that outer radial surface 73 of bore sealing ring 70 sealingly engages surface 33 of bore 32. Inner radial surface 77 of sealing ring 70 is radially inwardly disposed from surface 73 so as not to contact or interfere with insertion of conduit 50 through expansion joint 34 during operation, while ensuring that lateral flat sealing surfaces 74 and 76 of bore sealing ring 70 provide adequate sealing and support for conduit sealing rings 60 and 80. A second conduit sealing ring 80 and a cooperating bore sealing ring 90 may be provided to augment the sealing capability of sealing portion 62 of conduit sealing ring 60 by establishing an analogous sealing portion 82 of conduit sealing ring 80.

After assembly and desired positioning of conduit 50 through expansion joint 34, a lock ring 37 and a retaining ring 39 are laterally forceably applied against surface 96 of bore sealing ring 90. This in turn forces sealing engagement between lateral sealing surface 94 of bore sealing ring 90 and lateral sealing surface 86 of conduit sealing ring 80, lateral sealing surface 88 of conduit sealing ring 80 and lateral sealing surface 76 of bore sealing ring 70, lateral sealing surface 74 of bore sealing ring 70 and lateral sealing surface 66 of conduit sealing ring 60, and lateral sealing surface 68 of conduit sealing ring 60 and a substantially radially inwardly extending (with respect to bore 32) sealing surface 38 of bore 32. Surface 38 defines a transition region beween the greater diameter portion of bore 32 defined by surface 33 and the lesser diameter portion of bore 32 defined by surface 31 and provides a purchase area, or land, for opposing the lateral sealing force applied by lock ring 37 and retaining ring 39. A circumferential relief 67 may be provided at the intersection of surfaces 33 and 38 of bore 32. Once sealing rings 60, 70, 80 and 90 are forceably sealingly engaged by lock ring 37 and retaining ring 39, sealing rings 60, 70, 80 and 90 are immovable with respect to each other and with respect to conduit 50 and bore 32.

The configuration of expansion joint 34 as shown in FIG. 3 is representative of expansion joint 34 receiving conduit 50 having a central axis 55 substantially coextensive with central axis 53 of bore 32. Reference line 57 represents the maximum amount of skew of central axis 55 of conduit 50 with respect to central axis 53 of bore 32 suggested for the illustrated embodiment. Increasing the diameter of surfaces 31 and 33 while increasing the outward radial extent of surfaces 73 and 93 to insure sealing engagement with surface 33, will permit the angle, and thereby the maximum permissable skew, between reference line 57 and central axis 53 of bore 32 to be increased.

Referring to FIG. 4, an enlarged partial sectional view of expansion joint 34 with the skew between central axis 55 of conduit 50 and central axis 53 of bore 32 exaggerated for ease of explanation is shown. It is noted that since conduit 50 is disposed through bore 32 such that axis 55 of conduit 50 is skewed with respect to axis 53 of bore 32, conduit sealing rings 60 and 80 are displaced toward surface 33 of bore 32 so that accommodation area 65 and 85, respectively, are not uniform around the periphery of sealing rings 60 and 80. Surface 64 of conduit sealing ring 60 is shown in cross section as having the shape of an arc of a circle with radius r. Surface 64 contacts the periphery of conduit 50 along a tangential line which is shown as point 62 in this view. Also indicated is point 67 on surface 64 which represents the intersection of surface 64 with the axial center 69 of conduit sealing ring 60.

During assembly of conduit 50 through bore 32, constituents of expansion joint 34, such as lock ring 37, retaining ring 39, conduit sealing rings 60 and 80, and bore sealing rings 70 and 90 may be positioned on conduit 50 before an end of conduit 50 is passed through bore 32. The above-noted constituents of expansion joint 34 may then be traversed along conduit 50 to be appropriately positioned within bore 32. As conduit seating ring 60 is seated in bore 32, it is rotated about the periphery of conduit 50 so that lateral sealing surface 68 properly sealingly mates with sealing surface 38 of bore 32 (i.e. sealing surface 68 is substantially radially disposed in bore 32), while point 62 of surface 64 tangentially sealingly engages the periphery of conduit 50. Bore sealing ring 70 is then situated in bore 32 so that lateral surface 74 of bore sealing ring 70 sealingly engages lateral surface 66 of conduit sealing ring 60. Next, conduit sealing ring 80 is disposed in bore 32 so that lateral surface 88 of conduit sealing ring 80 sealingly engages lateral surface 76 of bore sealing ring 70 while point 82 of surface 84 tangentially sealingly engages the periphery of conduit 50. Note that it is necessary that conduit sealing ring 80 radially translate inward (downward in FIG. 4) to effectuate desired sealing at point 82 of surfacae 84, resulting in uneven spacing between surfaces 63 and 83, respectively, and surface 33 of bore 32 and thereby a greater radial extent for accommodation region 85 than for accommodation region 65 in this view. Further, binding and/or interference at the interface between surfaces 64 and 84 and periphery conduit 50 is avoided during assembly whenever central axis 55 of conduit 50 is displaced from central axis 53 of bore 32.

The existing diameters of surface 31 and 33 of a conventional bore 32 may have to be increased in order to accommodate additional anticipated radial translation by conduit sealing rings 60 and 80, whenever features of the present invention are employed as a retrofit for existing expansion joints. After conduit 50 is disposed in its desired relationship with respect to the turbine members, i.e. reheat tub diaphragm 20, inner shell 30, and outer shell 40 (FIG. 1), lock ring 37 and retaining ring 39 (FIG. 3), along with analogous lock rings and retaining rings of expansion joint 24 and 44, are secured, thereby ensuring sealing engagement between conduit 50 and associated expansion joints 24, 34 and 44 (FIG. 1). Further, bore sealing rings and conduit sealing rings of expansion joints 24, 34 and 44 are sealingly laterally compressed so that steam cannot leak among cavities 25, 35, 45 and atmosphere 55.

Thus has been illustrated and described an improved slip-type expansion joint for sealingly receiving a conduit while accommodating misalignment in the registration of bores receiving the same conduit through other turbine members or misalignment between the central axis of the conduit and the central axis of the bore. Further, the slip-type expansion joint of the present invention may be readily retrofitted to existing turbine components without hindering operation of the components and will accommodate misalignment between the desired orientation and the actual orientation of the conduit through the bore.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is :

1. A slip-type expansion joint for sealingly receiving a component through an opening in the expansion joint, comprising:
    bore sealing means having an inner surface defining a hole therethrough, an outer surface for sealingly engaging a bore of a member in which the bore sealing means is adapted to be disposed and a lateral surface; and,
    component sealing means having an inner surface defining a hole therethrough and a lateral surface for sealingly engaging the lateral surface of said bore sealing means, wherein the hole of the bore sealing means and the hole for the component sealing means are alignable for forming the opening in the expansion joint, and; further wherein a first portion of the inner surface of said component sealing means is relieved such that only a second portion of the inner surface of said component sealing means sealingly engages the component, along a line which is tangent to the component, whenever the component is received through the opening in the expansion joint wherein the inner surface of the component sealing means is in the shape of a U in cross section.

2. An expansion joint as in claim 1, wherein the inner surface of the component sealing means is in the shape of an arc of a circle in cross section.

3. An expansion joint as in claim 1, wherein the inner surface of the component sealing means is in the shape of a parabola im cross section.

4. In a steam turbine, joint sealing means for sealingly receiving a conduit through an opening in the joint sealing means, said joint sealing means comprising:
    bore sealing means having an inner surface defining a hole therethrough, an outer surface for sealingly engaging a bore of a component of the turbine in which the bore sealing means is adapted to be disposed and a lateral surface; and,
    conduit sealing means having an inner surface defining a hole therethrough and a lateral surface for sealingly engaging the lateral surface of said bore sealing means, wherein a first portion of the inner surface of said conduit sealing means is relieved such that only a second portion of the inner surface of said conduit sealing means sealingly engages the conduit, along a line which is tangent to the conduit, whenever the conduit is received through the opening in the joint sealing means, and further wherein the hole of said bore sealing means and the hole of said conduit sealing means are alignable so as to define the opening in the joint means wherein the inner surface of the conduit sealing means is in the shape of a U in cross section.

5. Joint sealing means as in claim 4, wherein the inner surface of the conduit sealing means is in the shape of an arc of a circle in cross section.

6. Joint sealing means as in claim 4, wherein the inner surface of the conduit sealing means is in the shape of a parabola in cross section.

7. In a steam turbine, a plurality of joint sealing means each respectively adapted to be disposed in a respective bore of a respective member of the turbine, each bore having a central axis, and the central axis of each of the plurality of joint sealing means mutually registrable within a predetermined amount of misalignment, and each of the plurality of joint sealing means for sealingly receiving a conduit through an opening in each of the plurality of joint sealing means, at least one of the plurality of joint sealing means comprising:

bore sealing means having an inner surface defining a hole therethrough, an outer surface for sealingly engaging the bore of the member of the turbine in which the bore sealing means is adapted to be disposed and a lateral surface; and, conduit sealing means having an inner surface defining a hole therethrough and a lateral surface for sealingly engaging the lateral surface of said bore sealing means, wherein a first portion of the inner surface of said conduit sealing means is relieved such that only a second portion of the inner surface of said conduit sealing means sealingly engages the conduit, along a line which is tangent to the conduit, whenever the conduit is received through the opening in the joint sealing means, and further wherein the hole of said bore sealing means and the hole of said conduit sealing means are alignable so as to define the opening in the joint sealing means wherein the inner surface of conduit sealing means is in the shape of a U in cross section.

8. At least one of the plurality of joint sealing means as in claim 7, wherein the inner surface of the conduit sealing means is in the shape of an arc of a circle in cross section.

9. At least one of the plurality of joint sealing means as in claim 7, wherein the inner surface of the conduit sealing means is in the shape of a parabola in cross section.

* * * * *